(12) United States Patent
Kass

(10) Patent No.: US 7,559,063 B2
(45) Date of Patent: Jul. 7, 2009

(54) PROGRAM FLOW CONTROL IN COMPUTER SYSTEMS

(75) Inventor: Eric R. Kass, Mannheim (DE)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 11/145,448

(22) Filed: Jun. 3, 2005

(65) Prior Publication Data

US 2005/0273785 A1 Dec. 8, 2005

(30) Foreign Application Priority Data

Jun. 3, 2004 (DE) .................................. 04102490

(51) Int. Cl.
*G06F 9/46* (2006.01)
*G06F 9/48* (2006.01)
*G06F 9/40* (2006.01)
*G06F 9/42* (2006.01)

(52) U.S. Cl. .................. 718/108; 718/102; 718/106

(58) Field of Classification Search .............. 718/106, 718/102, 108
See application file for complete search history.

(56) References Cited

U.S. PATENT DOCUMENTS 5,659,749 A  *  8/1997  Mitchell et al. ............. 718/108
5,694,333 A  *  12/1997 Andrade et al. ............. 710/26
5,708,808 A  *  1/1998  Shoichi ...................... 718/108
6,542,920 B1 *  4/2003  Belkin et al. ................ 718/104
2005/0155034 A1 * 7/2005 Jiang et al. .................. 718/106
2005/0262181 A1 * 11/2005 Schmidt et al. ............. 709/200

OTHER PUBLICATIONS

Russell Bateman, "Features of the Novell Kernel Services Programming Environment for NLMs: Part Two," Oct. 1, 1999, pp. 1-15, NOVELL web.archive.org/erb/20010112062500/developer.novell.com/research/devnotes/1999/october/04/05.htmm.

* cited by examiner

*Primary Examiner*—Li B Zhen
(74) *Attorney, Agent, or Firm*—Steven Chiu; Arthur Ortega

(57) ABSTRACT

Application programs supporting multiple contexts on a computer system having an operating system supporting threads. The method comprises processing a context processing instruction from the run-time application program, evaluating said instruction in relation to program-flow control yielding context-defining processing parameters, analyzing the context-defining processing parameters from the execution context of the context processing instruction in regard of program flow management by threads, mapping the context-processing instruction to a selected thread managing instruction, or to a selected set of thread managing instructions, having a respective program flow control effect equivalent to that of context-processing instruction, invoking the selected thread managing instruction or the set thereof, together with selected parameters so that that during runtime of the application program only one thread is allowed to execute at a time, and the program state of a thread is stored at a given point in time and is restored later from the point in time.

4 Claims, 10 Drawing Sheets

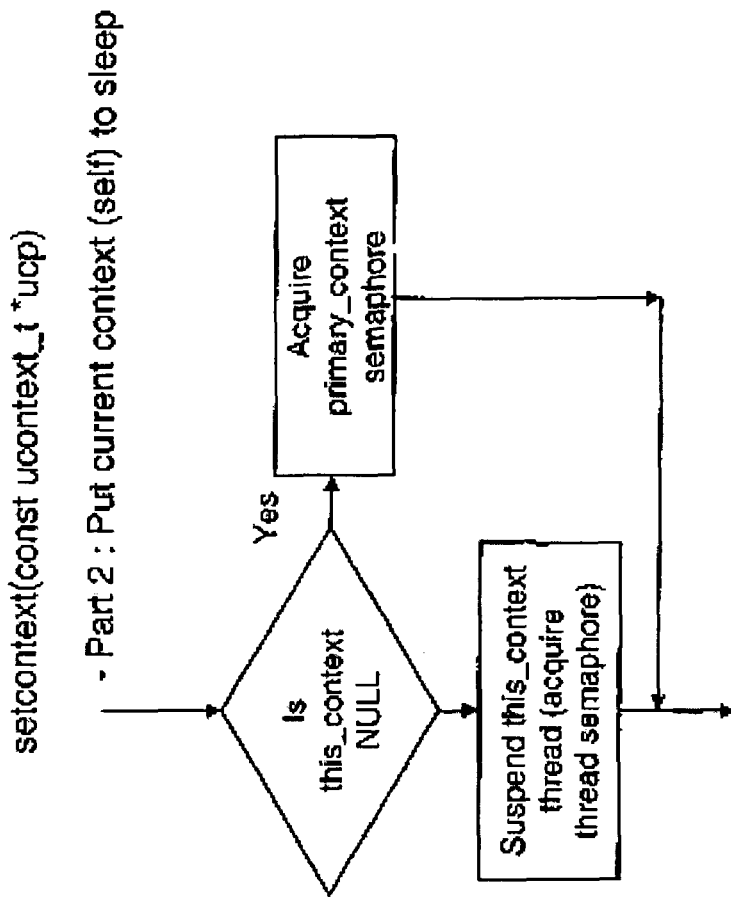
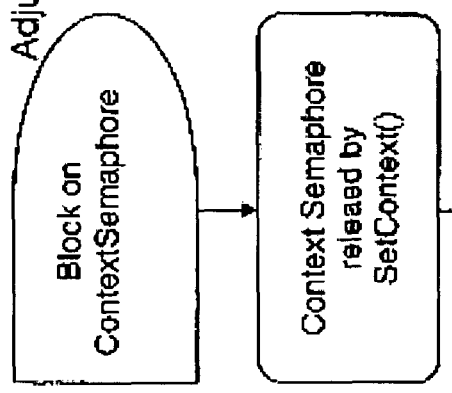

PROGRAM FLOW CONTROL IN COMPUTER SYSTEMS

BACKGROUND OF THE INVENTION

1. Field of the Invention

The present invention relates to program flow control in computer systems, and in particular to a method for running application programs on a computer system having an operating system, supporting threads, semaphore mechanisms and long-jumps, wherein said operating system does not support context processing due to the lack of a mechanism to access the central processing unit (CPU) state.

2. Description and Disadvantages of Prior Art

The general purpose computer, a finite approximation of the universal Turing machine, maintains state only in a finite set of transistors and optionally in a limited magnetic storage. A specific portion of the state of a program running within a computer is defined herein a context as used in prior art terminology. A context may be regarded as a snapshot of the runtime flow of a program as seen by the CPU. In large, this snapshot contains the set of CPU computational registers, the instruction pointer, a record of the execution path of the program, ie the invocation stack and the possibly separate but associated automatic storage and function call parameters residing along the execution path, ie the parameter stack. A context does not encapsulate memory allocated from heap and does not maintain a copy of the static storage used in runtime of the application program.

Maintaining multiple contexts is useful for programs wishing to sustain multiple concurrent runtime states but where only one state is active at a time. Discrete simulation is a typical example; modeled entities might maintain state by running as separate computational tasks. In this case in prior art computer systems supporting context processing a simulation manager orchestrates, which entity performs each discrete simulation step. After each step, the entity returns control to the manager.

For example, on UNIX platforms, so-called "u-context" functions are provided as part of the operating system. Such u-context functions may be seen herein as a standard Application Programming Interface (API) for storing and restoring a program's runtime context. Any reference thereto is to be understood broadly and shall include also implementations other than UNIX.

The API set consists of four functions. All functions operate on a structure defined as ucontext_t. The information in ucontext_t is sufficient for restoring the CPU to a precise program execution state. In alphabetical order:

getcontext( )—takes a snapshot of the current computing state. The context can be used to return exactly to "this" point in the program at a later time.

makecontext( )—builds a new context, or modifies an existing one such that when the context is activated, a specified function will be invoked.

setcontext( )—takes as input a context built with either getcontext( ) or makecontext( ) and switches the CPU to start executing in that context swapcontext( )—basically a getcontext( ) in the currently running context, followed a setcontext( ) to another context.

In general, the need to keep multiple program flows active and interacting with one-another while each flow is independent is best satisfied in prior art by the use of "context processing". Prior art contexts also provide a basic infrastructure needed for co-operative multitasking. One prior art approach to task orchestration is to rely on a sort of context-to-context messaging to provide the context switch triggering events.

Disadvantageously, in many business environments there are many platforms in use that do not support context processing while applications increasingly require the ability to process multiple contexts. The basic structure of the prior art thread-based program control is depicted in FIG. 1. A runtime version of an application program depicted left in FIG. 1 comprises exemplarily a number of three tasks 12A, 12B, 12C. Each task is executed in a respective thread 14A, 14B 14C. At the end of the thread run, which flows in a direction from bottom to top as indicated by the arrow, a respective semaphore mechanism 16A, 16B, 16C indicates the end of the thread to the CPU 18. The application itself must control the sequence of the threads, e.g. by prior art semaphore mechanisms.

Generally, such environments are platforms in which the operating system does not offer any instruction which enables updating the CPU state as described above. Examples for such platforms are the IBM iSeries server, which is used in enterprises successfully since more than 15 years, further, platforms, on which interpretive languages run, on which platform-independent languages like Java run.

A prior art approach discloses a mechanism to swap contexts between threads. Disadvantageously, this prior art approach does not offer full context compatibility, as it does not provide a "setcontext" and "getcontext" capability.

OBJECTIVES OF THE INVENTION

It is thus an objective of the present invention to offer the ability to run application programs designed for context processing on above mentioned platforms which per se do not support context processing.

SUMMARY AND ADVANTAGES OF THE INVENTION

This objective of the invention is achieved by the features stated in enclosed independent claims. Further advantageous arrangements and embodiments of the invention are set forth in the respective subclaims. Reference should now be made to the appended claims.

According to the basic aspect of the present invention a method is disclosed for running application programs supporting multiple contexts on a computer system having an operating system supporting threads and not supporting multiple context processing instructions, which is characterized by the steps of:

a) processing a context processing instruction from said run-time application program, b) evaluating said instruction in relation to program-flow control yielding context-defining processing parameters, c) analyzing said context-defining processing parameters from the execution context of said context processing instruction in regard of program flow management by threads, d) mapping said context-processing instruction to a selected thread-managing instruction or to a selected set of thread managing instructions, having a respective effect of program flow control equivalent to that of said context-processing instruction, e) invoking said selected thread managing instruction or said set thereof, together with selected parameters for guaranteeing that during runtime of said application program:

e1) only one thread is allowed to execute at a time, and e2) the program state of a thread may be stored at a given point in time and may be restored later from said point in time.

The state of a program may be understood in here to comprise the values of sp (stack pointer), fp (frame pointer), and pc (program counter). A program state is thus completely defined by these set of registers and the contents of the memory, which includes e.g. the heap and the stack.

In simpler words the inventional method performs a mapping of semantics and syntax of existing prior art context processing functionality, and in particular of the so-called "ucontext" API functionality used for prior art context processing to said threads, semaphore mechanisms and longjumps for emulating context semantics, wherein the context semantic is defined as the ability to store the current state of a processor in any point of runtime of the application program and to restore any previous processor state. Thus, above measures e1) and e2) provide for successful mapping between context processing and thread management either in single threaded but in particular in multi-threaded environments.

Thus, the general advantage is achieved that applications which are designed for context processing may be run on platforms, which do not support context processing. The present invention allows to use application programs using prior art context processing in multi-threaded operation environments without needing to change the application code. For the sake of concreteness, the context processing is herein described exemplarily by aid of u-context processing instructions.

The idea behind this inventional approach is that the information in a context is a superset of that which is required by prior art "setjmp" or "sigsetjmp" operating system operations: The setjmp interface provides a method to return to any previous point in a program. The ucontext interface, in contrast, is able to manage separate and complete invocation paths.

The difference between threads and contexts is semantic; contexts are serial in nature, whereas threads are parallel; only one context is active at a time. Like threads, contexts provide the ability for a program to contain multiple execution flows; though unlike threads, contexts guarantee serial access to resources.

Further advantageously, the execution of a thread may be stopped by a semaphore instruction, when in the the run-time application program execution a getcontext instruction is executed.

Further advantageously, a thread is encapsulated by a class providing invocation, suspend, and resume methods.

According to the invention contexts and threads may coexist. A thread itself can contain multiple contexts such that any single thread is "executing" only one context at a time, but multiple threads could be executing "their" current contexts in parallel.

The "u-context" interface in particular has the ability for a context switch to return to any previous "save"-point inside a context. The "program sequence" initiating the switch can select to switch to any "save"-point inside another context. This is an advantageous feature not intrinsically possible with threads alone.

Thus, the above-mentioned prior art by Novell may be greatly improved by the inventional context-to-thread-mapping mechanism. Further, in existing applications, which only use makecontext( ) and swapcontext( ) APIs, the swapping context reduces to simple semaphore control without the need to record CPU state in "sigjmp_buf" buffer structures. During swapcontext( ) the current thread is thus stopped, and the one to be activated, is released.

BRIEF DESCRIPTION OF THE DRAWINGS

The present invention is illustrated by way of example and is not limited by the shape of the Figures of the drawings in which:

FIGS. 5 and 6 are a schematic diagram showing details of the control flow in an inventional new contexts's bootstrap( ) function implementation;

FIGS. 7, 8, and 9 are each a schematic diagram showing details of the control flow in an inventional setcontext( ) function implementation.

DETAILED DESCRIPTION OF THE PREFERRED EMBODIMENT

With general reference to the Figures an exemplary implementation of the inventional method will be described in more detail.

Figure 1:
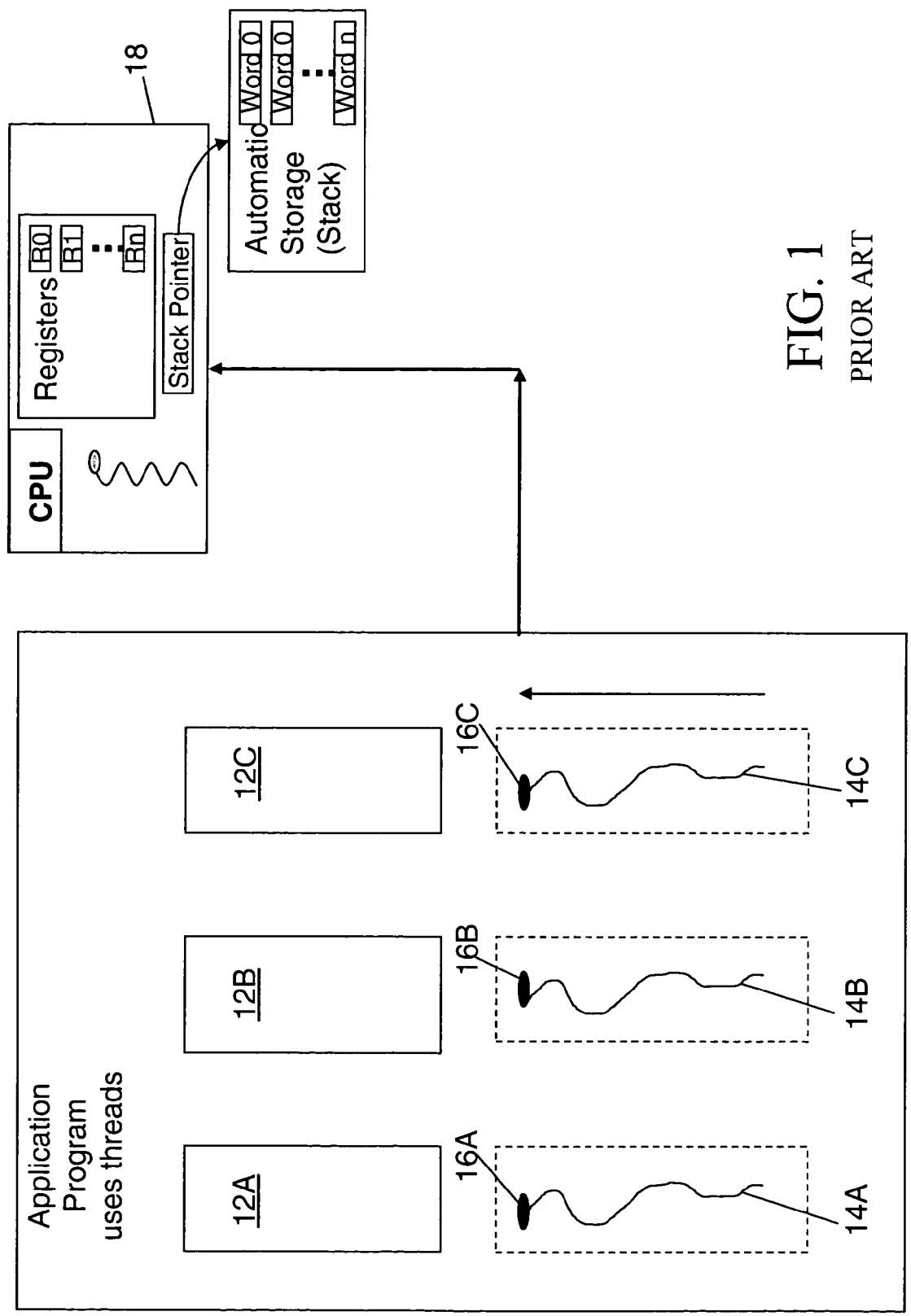
FIG. 1 is a system diagram depicting application runtime flow, threads, and the CPU, illustrating prior art thread control.
Figure 2:
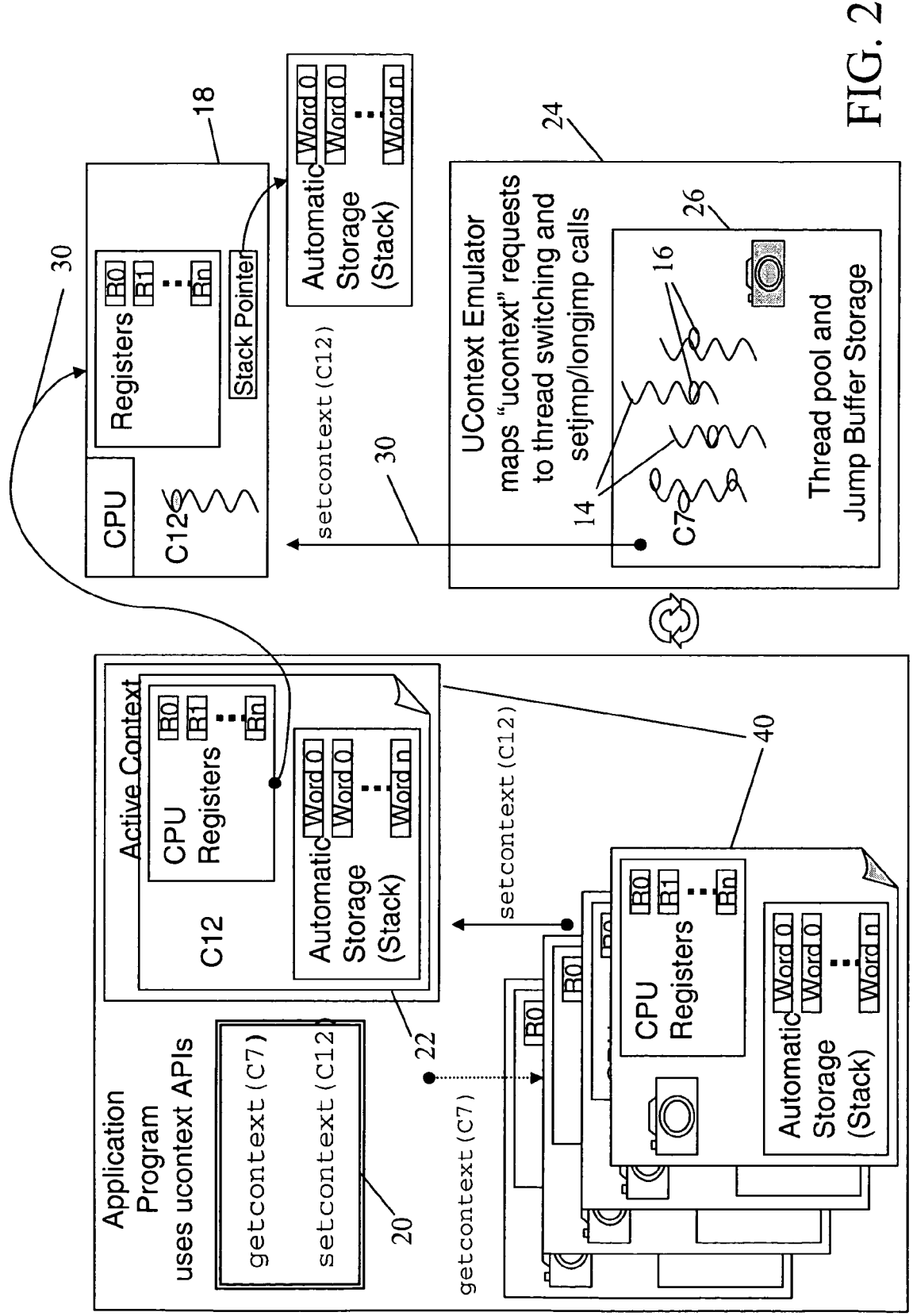
FIG. 2 is a system diagram depicting application runtime flow, contexts, threads, and the CPU, illustrating the thread control including contexts according to the invention.

With reference to FIG. 2, a system diagram is given first representing the most important structural elements used in the inventional method. With concurrent reference to FIG. 2A respective basic steps of the control flow during the inventional method are depicted.

Again the Application program is depicted left. It is designed for context processing and thus comprises the prior art context processing APIs, and in particular those mentioned earlier, ie "set context ( )" and "getcontext( )" instructions depicted by reference sign 20.

The currently active context 22 is depicted logically "within" the Application program, which is dependent on context processing as a mechanism for internal process flow control. The application program profits from the advantages inherent of context processing. The context is defined to comprise the elements as known from prior art, namely invocation stack, parameter stack, storage call parameters, instruction pointer, etc.

The before-mentioned prior art application program is designed for context processing, and may be assumed to be linked with an inventional program implementing the before-mentioned mapping or conversion layer between context and thread instruction.

Then the resulting executable program may be assumed to specify at any given point of run-time a u-context-specific instruction. The inventional method processes this instruction by reading it, step 210. Then an evaluation step 220 is performed, aiming at exactly emulating the context processing with thread processing. Thus, the read context instruction is interpreted in this sense, and in a subsequent step 230 the thread processing is prepared by generating the thread-specific parameters 40 required to run a thread instead of the context originally planned by the application programmer.

So, for example, a getcontext invocation done by the application program takes a snapshot of the current context, ie computing state, whereas a setcontext invocation requires a context specified by either "makecontext( )" API or "getcontext( )" API, and switches the CPU to start executing in the new context.

According to the invention this is realized by thread switching, step 260, as well as by setjmp, see step 240, and longjmp calls which are thread-specific instructions 16, see step 250, and the box 24, which thus provides for a kind of u-context emulating layer between the Application and the CPU, as it converts the u-context requests issued by the Application program code to thread managing instructions, as in particular to setjmp and longjmp calls, and semaphore mechanisms, or whatever control functions the operating system offers for thread control.

Those calls 240, 250 260, however, instruct the CPU 18 to execute the new threads, see step 270, as defined by said calls. Thus, the CPU behaves as if executing in a new context. As visible from the drawing a thread can be stopped according to the inventional method by semaphores 16 advantageously at any desired location within a thread 14, which is symbolically indicated in box 26. In FIG. 2 the context C12 is depicted to be executed by the CPU 18 after being invoked by the instruction "setcontext (C12) in the Application code (left side). A Thread buffer is used comparable to prior art use in order to store the processor state relevant to the point in time, when the getcontext invocation, see e.g. getcontext (C7) was done. The setcontext (12) invocation thus triggers a read out of the data collected in the thread pool for context C12 and a respective executing thereof with CPU 18.

Thus, a thread provides the invocation stack for a context. Further, "semaphores", i.e., program instructions implementing a prior art semaphore-mechanism, are advantageously used to control, which one of the threads is active at any point in time. It should be noted that the semantics of the "context APIs" make prior art thread switching using only semaphores insufficient as described above in the description of prior art, as the application programmer is free to call the getcontext( ) function at any time in his program. As, by definition, it must be thus possible to "jump" into any active execution point stored by getcontext( ), a setcontext( ) must first switch to the thread to be activated using semaphores, then it must restore the "in-the-thread" context.

Next, the definition of the prior art ucontext_t structure is given in order to improve clarity, which is used to record and transfer the CPU state. Many elements familiar to the Unix implementation remain advantageously for the reason of compatibility; most notably, the member uc_stack is typically set by Unix applications to allocate a call stack for new contexts before the call to makecontext( ).

```
typedef struct __ucontext_t
{
    const __ucontext_t *uc__link;        // Parent context
    const __ucontext_t *uc__dest;        // Child context
(ucontextTX only).
    sigset_t uc__sigmask;
    stack_t uc__stack;                    // Unused. For
compatiblity.
    mcontext_t uc__mcontext;              // Unused. For
compatiblity.
    sigjmp__buf jmpbuf;
```

-continued

```
    __uContext__Thread *uc__thread;
} ucontext_t;
```

According to the invention within the ucontext_t structure two independent sets of flow control information are present:

first, a pointer to a class that represents a thread;

second, a buffer to store the processor state.

This processor state buffer is advantageously the standard sigjmp_buf buffer used by sigsetjmp( ) and siglongjmp( ) functions 30. For C (programming language) runtime programs that do not maintain masks for asynchronous signals the buffer "jmp_buf" as known to a skilled reader is sufficient.

The three APIs getcontext( ), makecontext( ) and setcontext( ) are described next by flow chart diagrams in FIGS. 3, 4 and 5, respectively, wherein the direct mapping to thread control instructions according to this inventional embodiment is disclosed, where applicable.

Figure 3:
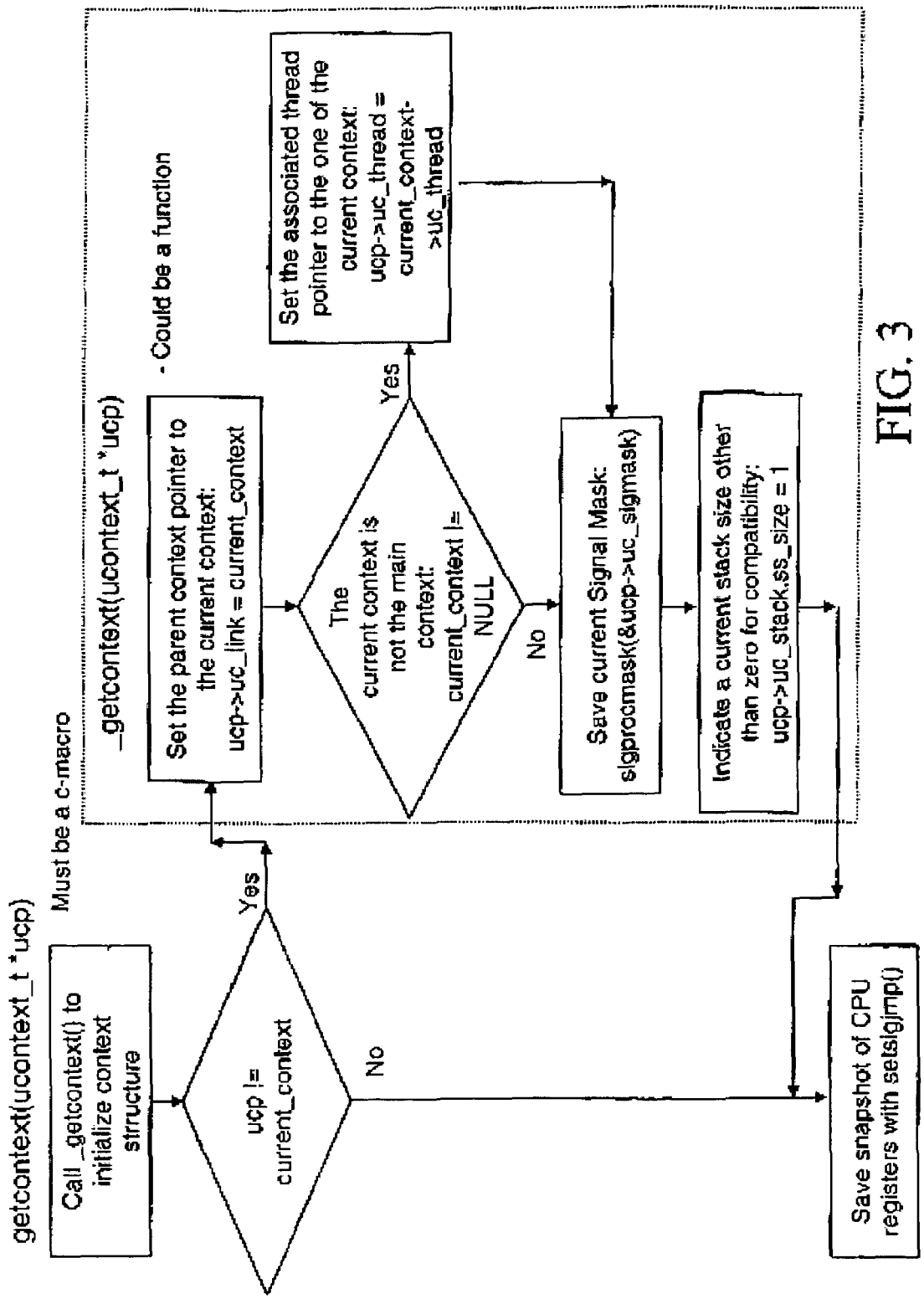
FIG. 3 is a schematic diagram showing details of the control flow in an inventional getcontext( ) implementation.

With reference to FIG. 3 the getcontext( ) instruction mapping is disclosed next in more detail using a C-macro (left portion calling a C-function (right portion):

The main purpose is to record a snapshot of the CPU and of the signal state. This function_getcontext(ucontext_t *ucp) initializes the ucontext_t structure passed into the function, retrieves the current signal mask, and then calls the function sigsetjmp 30 (left portion) to acquire the register set. In this specific implementation the portion of the function that invokes sigsetjmp must be contained within a C-language macro as it needs to run in the stack frame of the caller.

Figure 4:
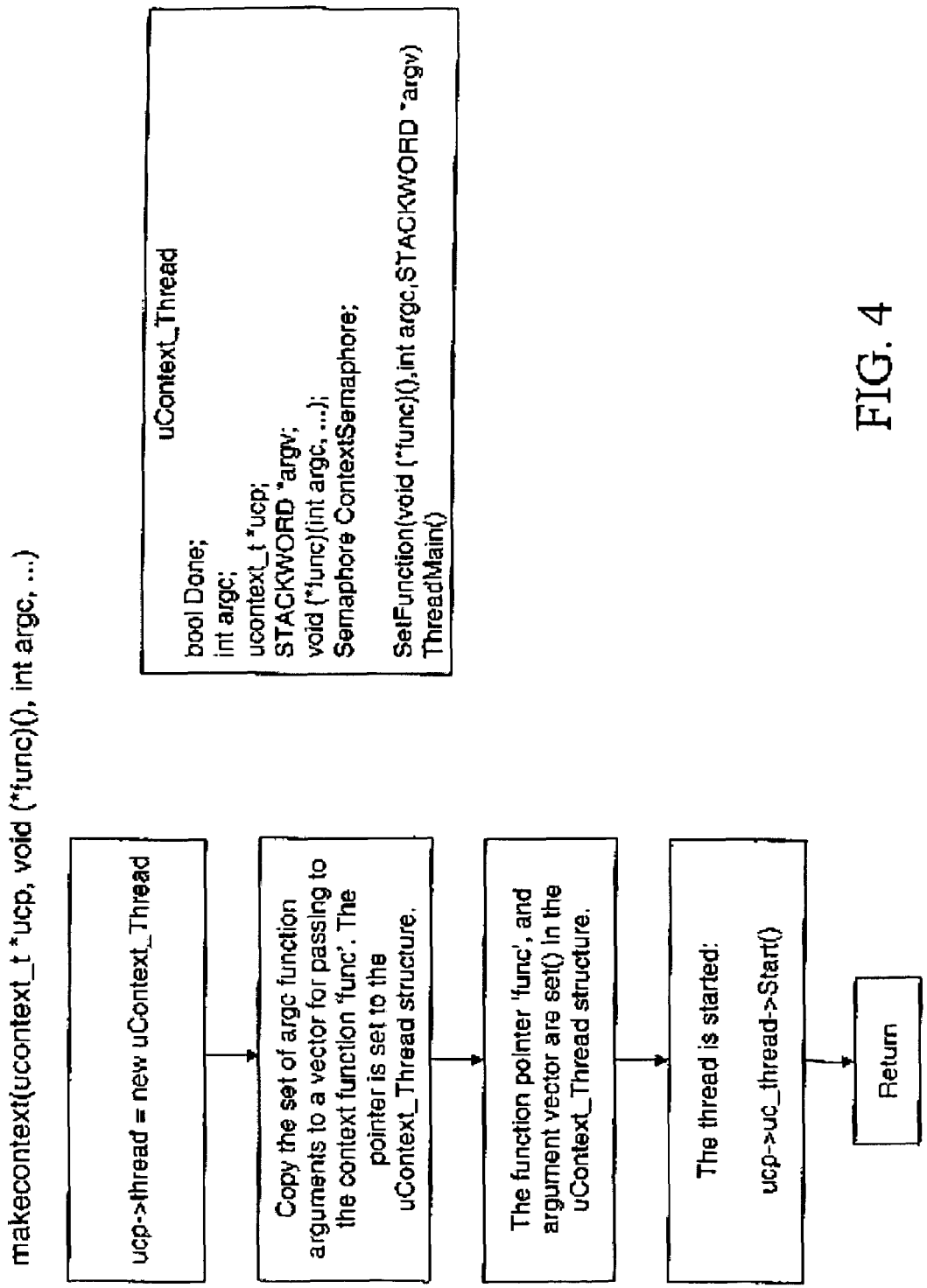
FIG. 4 is a schematic diagram showing details of the control flow in an inventional makecontext( ) implementation.

With reference to FIG. 4 the inventional makecontext( ) instruction mapping is disclosed in a similar way. This function builds up an ucontext_t structure such that a specified function with specified parameters is invoked when the context is made active.

According to the inventional embodiment a "thread" is encapsulated by a class providing invocation, suspend, and resume methods. An instance of the thread class is created at this point and the pointer is assigned to the uc_thread of the input argument to makecontext( ). Then the thread is started.

Figure 6:
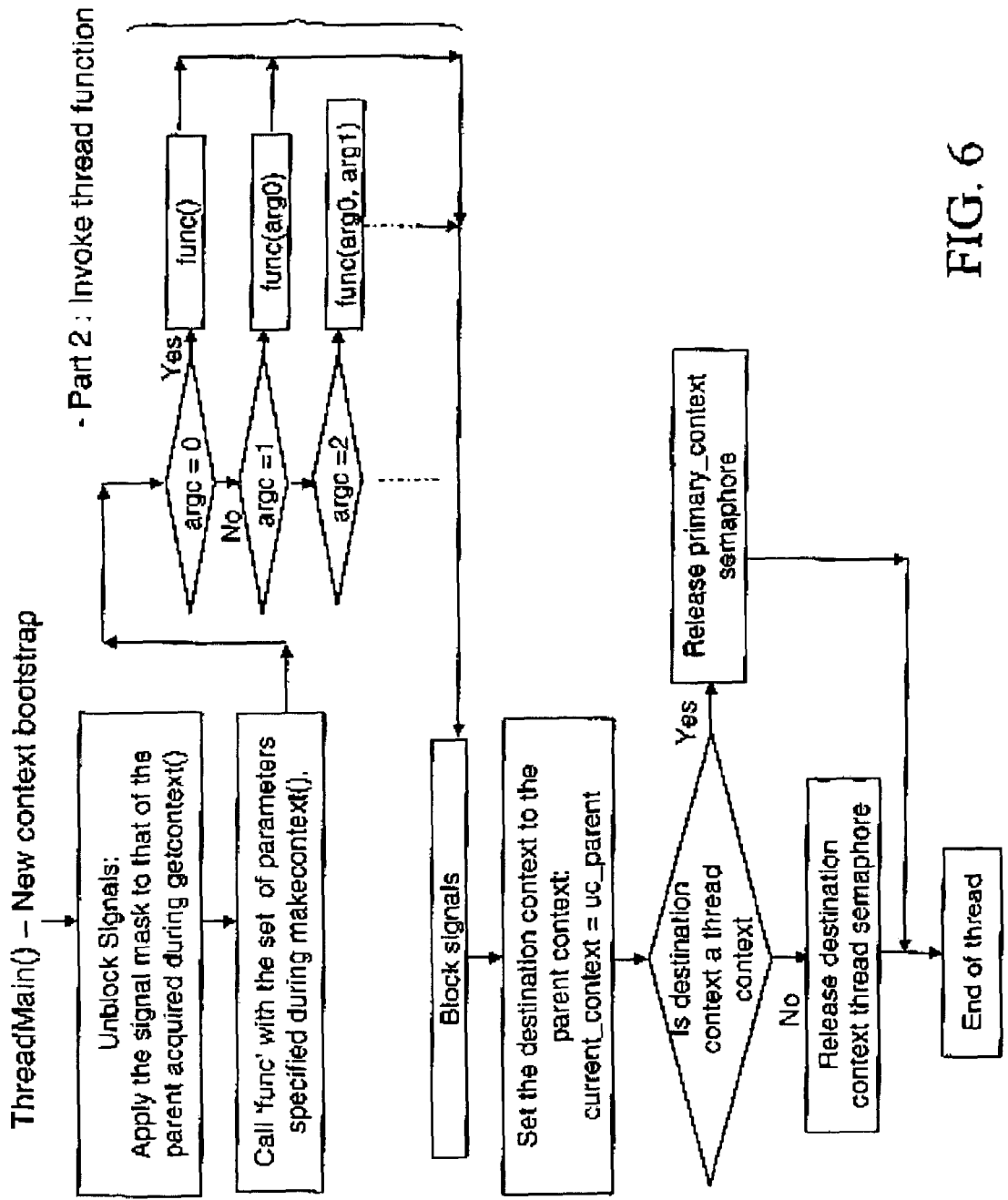

With further reference to FIG. 5, which may be subsumed under the step 230 in FIG. 2A, started by makecontext( ), the thread's bootstrap function immediately suspends the thread—awaiting to be awoken by setcontext( ) at a later point in time. with reference to FIG. 6 a call from another context to setcontext( ) has made the context referenced in FIG. 6 active (this context had been suspended at the end of FIG. 5), signals are unblocked by applying the signal mask of the parent context acquired during getcontext( ).

A user function passed to makecontext is awarded control; see the right portion in the Figure. The user function is the "main" routine of this new context. Until the user function returns, or the user function invokes another setcontext( ) function, this context will remain active. When this context runs to completion (user function returns), the bootstrap function activates the parent context—the other context that had last invoked setcontext( ) to make this context active—so that it appears the parent returned from setcontext( )—see Part 3 in setcontext( ) as defined further below and shown in FIG. 9.

Figure 2A:
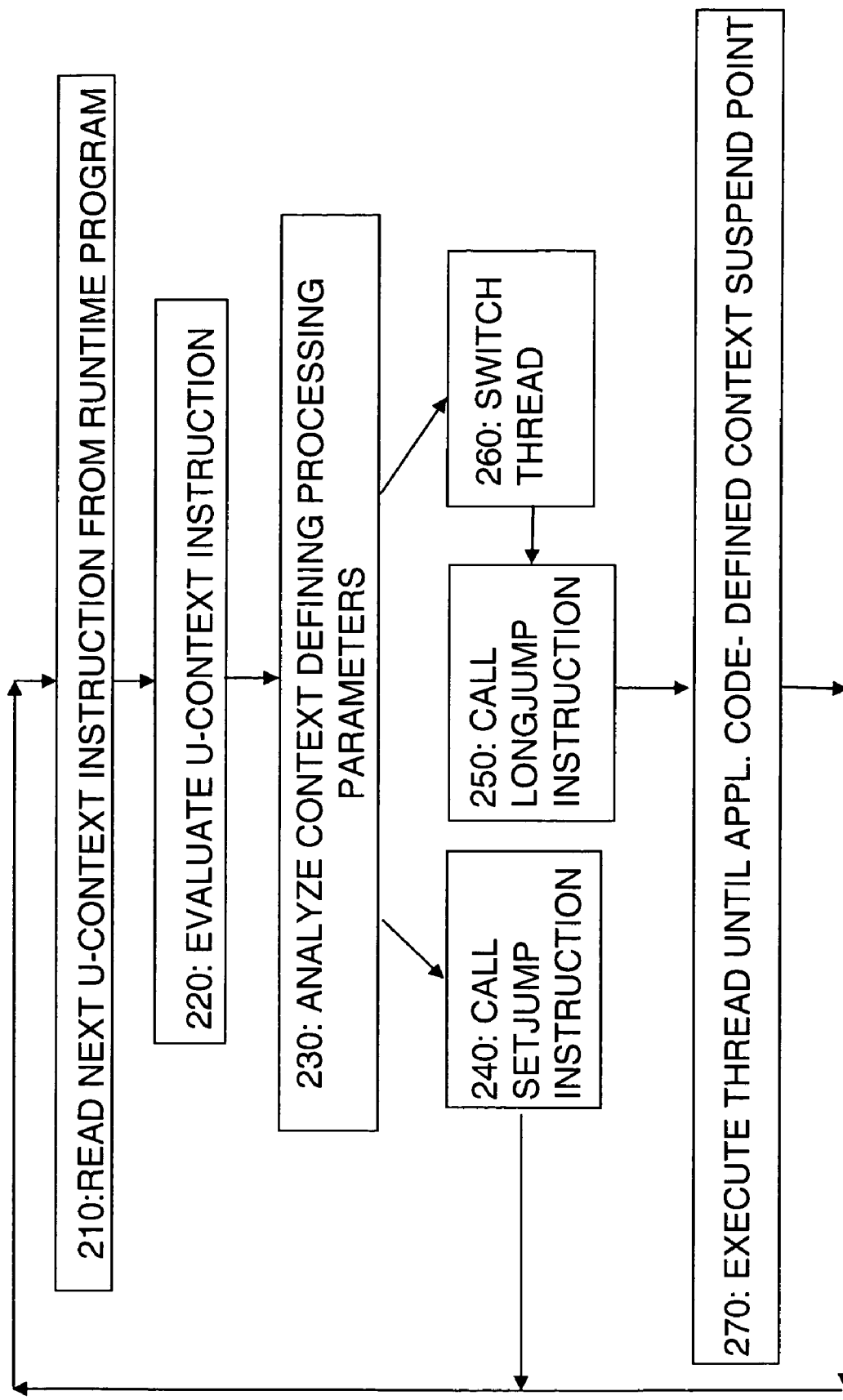
FIG. 2A is a schematic diagram showing the basic steps of the control flow inventional method in a SETJMP/LONGJMP implementation.
Figure 7:
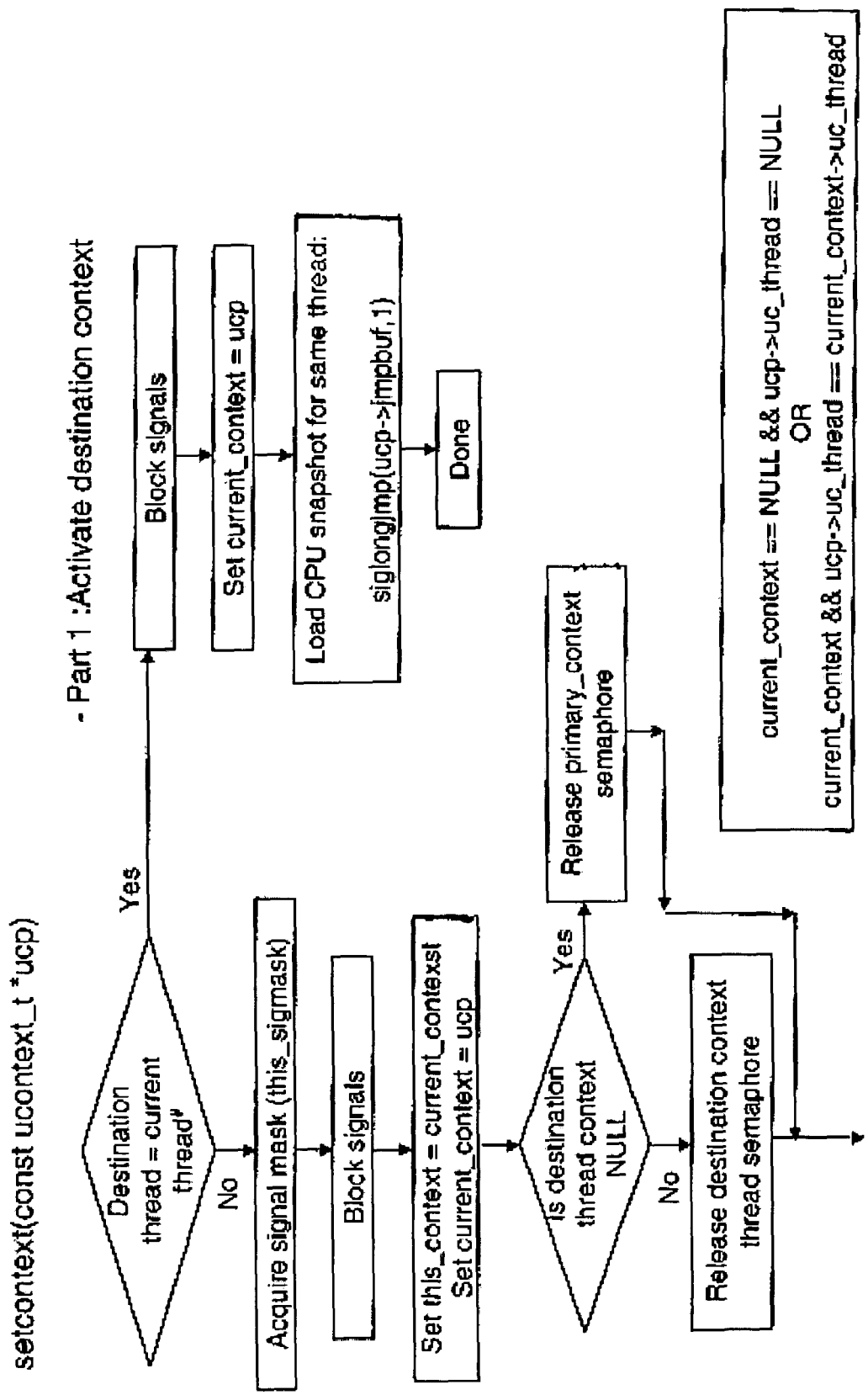
Figure 9:
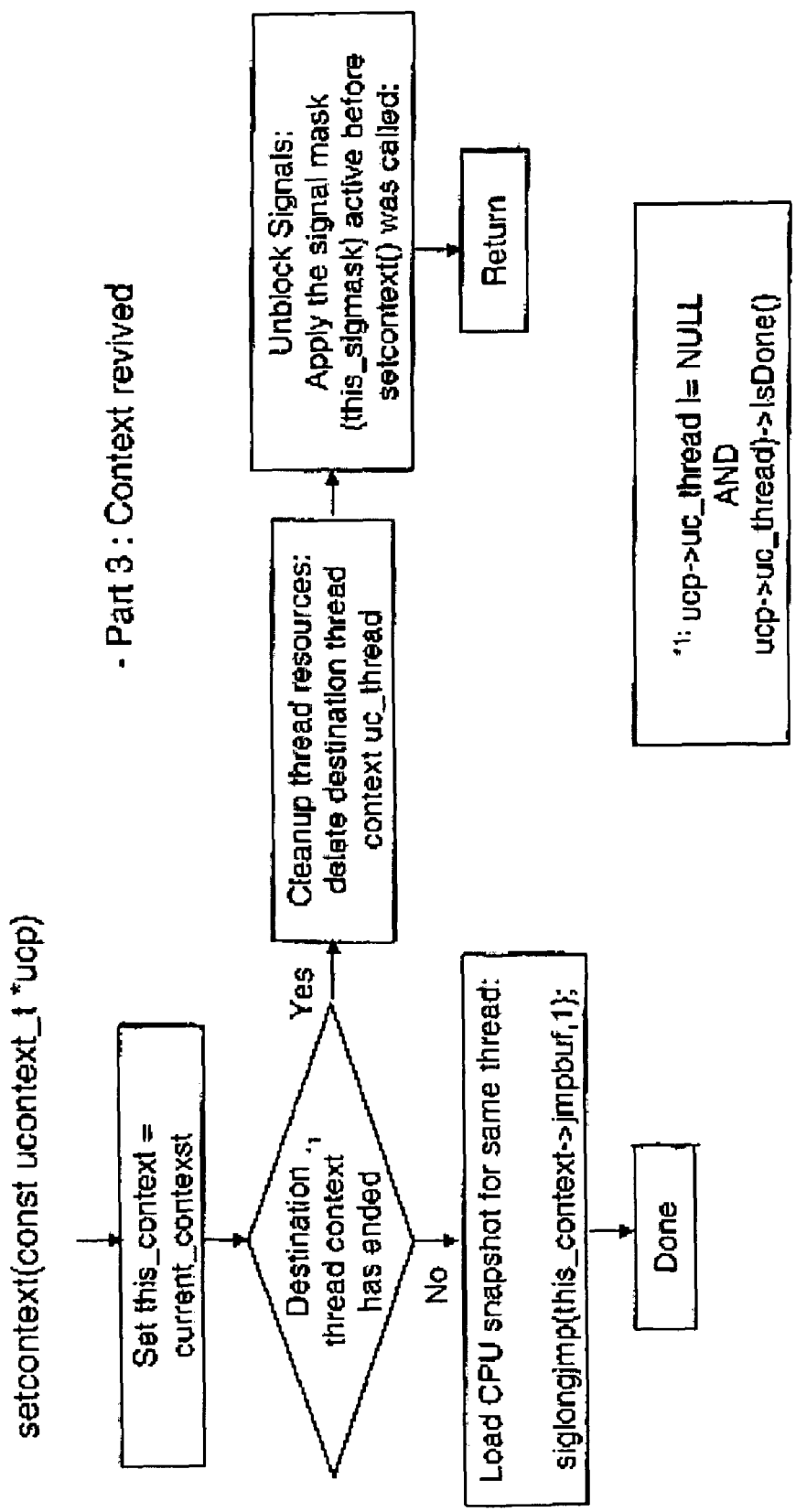

With reference to FIGS. 7, 8 and 9, which may be subsumed under the step 230 in FIG. 2A, the setcontext( ) instruction mapping according to this inventional embodiment is disclosed next in more detail:

The setcontext( ) function may be regarded as the "very core" of the u-context routines. It performs three tasks in sequence, depicted in FIGS. 7, 8 and 9, respectively. In words, setcontext( ) suspends the thread of the active context, releases the thread of the destination context, then loads the CPU with the register set stored in the CPU snapshot by calling longjmp with the information recorded by the associated getcontext( ).

As revealed from FIG. 7, Part 1, setcontext( ) activates the destination context thread by releasing its semaphore. The activated thread (context) starts executing at Part 3 (FIG. 9) or begins executing the function specified to makecontext( ). As revealed in FIG. 8, Part 2 the context that had invoked setcontext( ) suspends itself by acquiring its own semaphore.

Note that the steps in the flow chart involving signal masks and blocking signals are included for completeness—it is necessary to block asynchronous signals while in the midst of the context switch—though, under normal conditions, asynchronous signals would not be sent to the application process.

As revealed in FIG. 9 part 3, if the destination thread context has not yet ended (NO branch), it loads the CPU with the snapshot from getcontext( ), or in the YES branch, it returns regularly if the function passed to makecontext( ) ended normally. In the case where the destination thread context ended (the user's context function passed to makecontext( ) returned), any thread resources allocated during makecontext( ) are freed.

It should be noted that setcontext( ) might be active in two threads simultaneously for a short moment; the setcontext( ) least recently invoked is the first to complete; as Part 1 and 2 above executes in one thread and Part 3 executes in another thread. The context executing in Part 3 may be a context either 1) suspended by a previous call to setcontext( ) or 2) built during a call to makecontext( ) and suspended in ThreadMain( ), the new context's bootstrap (FIG. 5)

Figure 10:
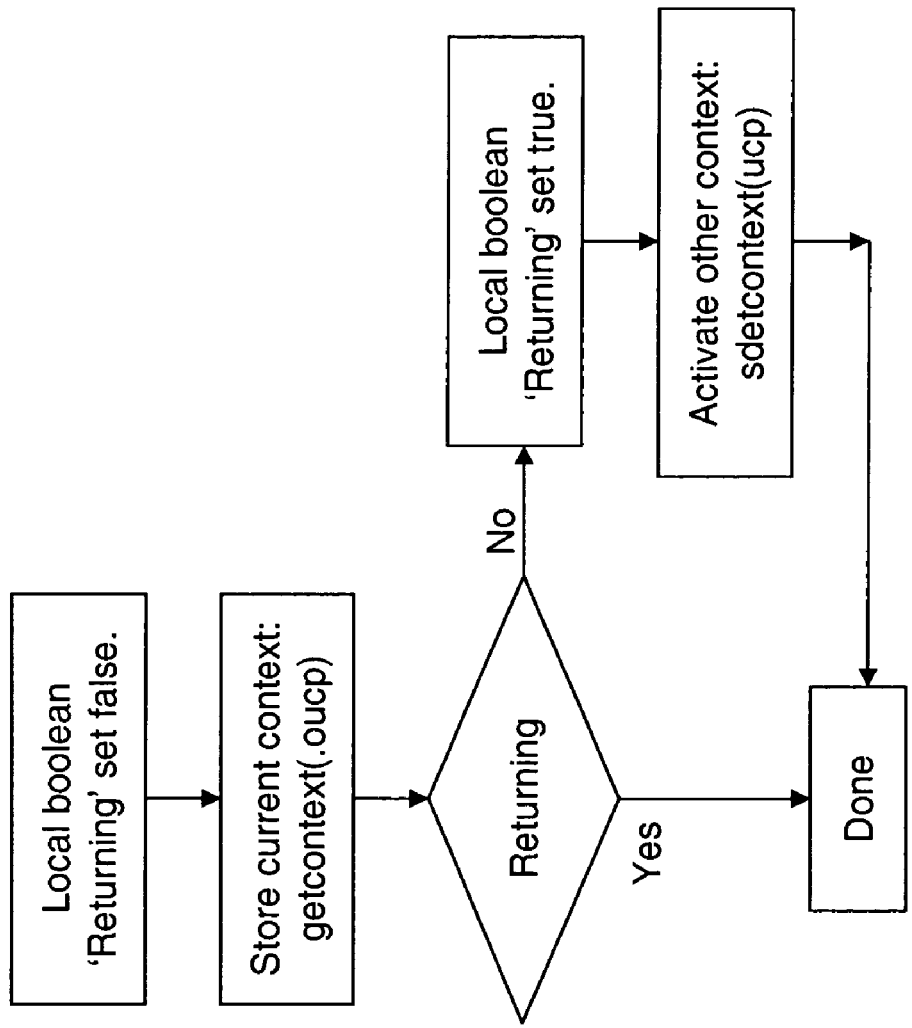
FIG. 10 is a schematic diagram showing details of the control flow in an inventional swapcontext( ) implementation.

According to FIG. 10, an inventional swapcontext( ) function implementation is disclosed for showing the advantageous feature of swapping between contexts.

Basically, this is a combination of getcontext( ), followed by setcontext( ). A Boolean on the local stack flags the procedure to initiate setcontext( ), or to return directly from getcontext( ).

With reference back to the general aspects of the invention without a specific figure in reference, according to a preferred aspect of the invention two pointers maintain state information between different contexts. One is the global current context pointer. It is set to the context thread that is currently active. The other is the uc_link field within each ucontext structure that points to the parent context. The uc_link is not typically modified by the application. By modifying this field, however, an application could modify to which context control is returned when an active context ends by way of returning from the user defined function previously passed to makecontext (FIG. 6).

In other words, the uc_link is either set to current_context, when getcontext( ) is called or could be assigned by hand to construct a parent-child relationship in order to obtain an atypical return sequence when context were to end, see the description for FIG. 5 above).

As the astute reader might recognize, further optimizations can be made and some extensions may be incorporated, as for example:

With a slight modification of the concept shown above it is also possible for a program that is itself multithreaded in the typical sense—referred here to a program containing a set of primary threads—to use contexts independently within each primary thread. Supporting this paradigm requires that "current-context" information that is global in the single threaded case, be stored in thread-local-storage (the appended pseudo code example demonstrates multi-threading capable code). The multi-threading supporting implementation is transparent to the application using the u-context APIs and is merely an enhancement that overcomes the single threading restriction of the before-mentioned description.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;
b) reproduction in a different material form.

Finally, an exemplary C-code example is appended in order to assure the completeness of the present disclosure.

Beginning of Code:

```
// UContext - Coroutines - via Threads: ucontext.h
//
//
//     Link with: ucontext.obj - For programs where only one non-context
//                thread makes calls to setcontext( ) and
//                swapcontext( ). That is their are not
//                concurrent threads using coroutines.
//
//                ucontextTX.obj - For multi-threaded programs.
//
//                ucontextSX.obj - For multi-threaded programs, but
//                without setcontext( ) support.
//
//
#ifndef __Thread_UContext_Emulator
    #define __Thread_UContext_Emulator
#include <assert.h>
#include <signal.h>
#include <setjmp.h>
#ifdef __WIN32
typedef int sigset_t;
#define sigjmp_buf jmp_buf
#define sigsetjmp(env,sigmask) setjmp(env)
#define siglongjmp longjmp
#endif
typedef void __uContext_Thread;      // Proxy for uContext_Thread.
typedef int mcontext_t;              // For compatiblity.
typedef struct              // For compatiblity.
    {
    void *ss_sp;
    size_t ss_size;
    int ss_flags;
    } stack_t;
typedef struct __ucontext_t
    {
    const __ucontext_t *uc_link;   // Parent context
    sigset_t uc_sigmask;
    stack_t uc_stack;              // Unused. For compatiblity.
    mcontext_t uc_mcontext;        // Unused. For compatiblity.
    sigjmp_buf jmpbuf;
    __uContext_Thread *uc_thread;
    } ucontext_t;
#ifdef __cplusplus
extern *C* {
#endif /* __cplusplus */
void makecontext(ucontext_t *ucp, void (*func)( ), int argc, ...);
int swapcontext(ucontext_t *oucp, const ucontext_t *ucp);
int __getcontext(ucontext_t *ucp);
```

```
int setcontext(const ucontext_t *ucp);
#define getcontext(ucp)                                    \
    (__getcontext(ucp) == 0 ? sigsetjmp((ucp)->jmpbuf,1) : −1)
#ifdef ___cplusplus
   }
#endif /* ___cplusplus */
```

Notes:

Version II

The original version had a dependency on the uc_link field that it had to point to a context containing a thread. This required that the thread context that a uc_link was pointing had not to be deleted until all children referencing the context were deleted (or at least not activated).

API:

getcontext(ucontext_t *ucp)
    Stores the current processor state and signal mask in 'ucp'.
    The function returns 0 on success, −1 otherwise.

setcontext(ucontext_t *ucp)
    Restores the context to 'ucp'. Processing continues as though getcontext( ) just returned.
    The function returns 0 on success, −1 otherwise.

swapcontext(ucontext_t *oucp, const ucontext_t *ucp)
    Stores the current context in 'oucp' and switches the context to 'ucp'.
    The function returns 0 on success, −1 otherwise.

makecontext(ucontext_t *ucp, void (*func)( ), int argc, . . . )
    Modifies the context 'ucp' that had been initialized with getcontext( ) such that 'func' is invoked when the context is made active with setcontext( ) or swapcontext( ).
    'func' receives the arguments that follow 'argc' in the makecontext( ) call. The integer value of 'argc' must be one-greater than the number of arguments that follow 'argc'; otherwise the behavior is undefined. For 5 arguments the value of argc must be 6. If 'func' takes no arguments then the value of 'argc' must be 1.
    When 'func' completes, It appears as though setcontext( ) just returned.
    'argc' must be equal to the number of parameters passed to 'func' including (argc−1) itself. Therefore

EXAMPLES

Example 1

```
#include <stdio.h>
#include <stdlib.h>
#include <ucontext.h>
ucontext_t home__context;
void func2( )
   {
   printf("Func2\n");
   return;
   }
void func1( )
   {
   printf("Func1\n");
   ucontext_t context2;
   getcontext(&context2);
   makecontext(&context2,func2,1);
   setcontext(&context2);
   setcontext(&home__context);
   return;
   }
main( )
   {
   bool Started = false;
   getcontext(&home__context);
   if (!Started)
      {
      Started = true;
      ucontext_t context1;
      getcontext(&context1);
      makecontext(&context1,func1,1);
      setcontext(&context1);
      }
   printf("Finished\n");
   return 0;
   }
```

Example 2

From the web: http://paul.rutgers.edu/~jarai/416/uc_yield.c

```
#include <stdio.h>
#include <stdlib.h>
#include <ucontext.h>
ucontext_t auc,buc,mainuc;
void a( )
   {
   int i;
   for (i=0; i<10; i++) {
      printf("a");
      swapcontext(&auc,&buc);
      }
   swapcontext(&auc,&mainuc);
   }
void b( )
   {
   int i;
   for (i=0; i<10; i++) {
      printf("b");
      swapcontext(&buc,&auc);
      }
   }
int
main(int argc, char *argv[])
   {
   printf("start\n");
   getcontext(&auc);
   if((auc.uc__stack.ss__sp=malloc(auc.uc__stack.ss__size))==NULL)
      perror("malloc"),exit(1);
   auc.uc__stack.ss__sp=(char*)
   auc.uc__stack.ss__sp+auc.uc__stack.ss__size;
   auc.uc__stack.ss__flags=0;
   makecontext(&auc,a,1);
   getcontext(&buc);
   if((buc.uc__stack.ss__sp=malloc
   (buc.uc__stack.ss__size))==NULL)
      perror("malloc"),exit(1);
   buc.uc__stack.ss__sp=(char*)
   buc.uc__stack.ss__sp+buc.uc__stack.ss__size;
   buc.uc__stack.ss__flags=0;
   makecontext(&buc,b,1);
   getcontext(&mainuc);
   swapcontext(&mainuc,&auc);
   printf("\ndone\n");
   return 0;
   }
```

Example 3

```
#include <signal.h> #include <stdio.h> #include <stdlib.h> #include <sys/time.h>
#include <unistd.h> #include <ucontext.h>
static volatile int expired; static ucontext_t uc[3]; static int switches;
static void f(intn)
    {int m = 0;
    while (1)
      {//This is where the work would be done
      printf("f(%i)\n",n); fflush (stdout);
      //The alarm sets the expired flag.
      if (expired)
        { if (++switches == 5) return; //Quit after awhile.
        printf ("\nswitching from %d to %d\n", n, 3-n);
        expired = 0; swapcontext(&uc[n], &uc[3-n]); }
      sleep (1); } }
void AlarmHandler (int signalnum)
    {printf ("In Alarm (signal number %d)\n",signalnum);
    expired = 1; alarm(1); return; }
void SetAlarm( )
    {struct sigaction sact; sigemptyset(&sact.sa_mask);
    sact.sa_flags = 0; sact.sa_handler AlarmHandler;
    sigaction(SIGALRM, &sact,NULL); return; }
int main(void)
    {char st[1]; char st[2]; //For Unix, not needed
    Pause( ); SetAlarm( ); alarm(1); getcontext(&uc[1]);
    uc[1].uc_lin &uc[0];      //For Unix don't need to do this
    uc[1].uc_stack.ss_sp_sp = st1;    //For Unix don't need to do this
    uc[1].uc_stack.ss_size = sizeof(st1);
    makecontext(&uc[1], (void(*)(void))f,2,1); getcontext(&uc[2]);
    uc[2].uc_link = &uc[0]; uc[2].uc_stack.ss_sp_sp = st2; //For Unix don't need to do this
    uc[2].uc_stack.ss_size = sizeof(st2);
    makecontext(&uc[2], (void(*)(void))f,2,2); swapcontext(&uc[0],&uc[1]);
    printf("\n"); return 0; }
**********************************************************/ #endif
//UContext - Coroutines - via Threads (Threadsafe): ucontextTX.cpp
//   WARNING: This module must only be linked in ONCE. Their may be only one instance
of the global CurrentContextKey
//****Context Pointers****
//ucp->uc_link - Points to parent context. This value is never NULL,
//DestinationContext - Points to the destination (child) context.
//GetCurrentContext - Thread local storage holds "this" context. Analogous to the static
current_context in ucontext.cpp. For the programs primary process thread or any thread not
invoked via makecontext ("main" thread), the GetCurrent( ) function creates a context structure
to represent this main context.
//ucp->uc_thread - Points to the thread for this context. Multiple contest may contain pointers to
the same thread if getcontext( ) had been issued from within the same context.
//ActiveSemaphore - Semaphore to prevent more than one real thread from switching in a
context concurrently.
//**********************************************************
#include <stdarg.h> #include <stdlib.h> #include <string.h> #include <ASThread.h>
#include <ucontext.h>
Typedef unsigned int STACKWORD;
//****Thread for "new"context (makecontext)****
Class uContext_Thread : public ASThread
    {private:
      bool Done; int argc; STACKWORD *argv; ucontext_t *ucp;
      Semaphore ActiveSemaphore; Semaphore ContextSemaphore;
      const ucontext_t *DestinationContext;
      void (*func)(int argc, . . . );
    protected:
      int ThreadMain( );
    public:
      uContext_Thread(ucontext_t *this ucp); ~uContext_Thread)( );
      bool IsDone( ) {return Done;}
      void SetFunction(void (*func)( ), int argc, STACKWORD *argv);
      Void Release (const ucontext_t *DC)
        {ActiveSemaphore.Take( ); //Not already active.
        DestinationContext = DC;
        Context Semaphore.Release( ); }      // Run . . .
      Const ucontext_t* Suspend( ) //Returns DC.
        { ActiveSemaphore.Release( );      //Mark not active.
        ContextSemaphore.Take( );      //Stop.
        Return DestinationContext; } };
//****Signal Control****
static bool BlockSignals( )
    {#ifndef_WIN32
```

```
            static sigset_t all; static boot initialized = false;
            if (!initialized) sigfillset(&all);
            return sigprocmask (SIG_BLOCK, &all,NULL) ==0;
        #else return true; #endif }
static bool GetSignalMask(sigset_t *sigmask)
        { #ifndef_WIN32 return sigprocmask (0,NULL,sigmask)==0; #else return true; #endif }
static bool SetSignalMask (const sigset_t *sigmask)
        { #ifndef_WIN32 return sigprocmask (SIG_SETMASK, sigmask, NULL)==0;
        #else return true; #endif }
//****Current Context (Thread Local Storage)****
static Mutex CurrentContextKeyMutex;
static STLSKey_t CurrentContextKey = INVALID_TLSKEY;
static void SetCurrentContext(const ucontext_t *ucp)
        {CurrentContextKeyMutex.Take( );
        If (CurrentContextKey ==INVALID_TLSKEY)
            {CurrentContextKeyMutex.Release( ); throw Error_Memory( ); } }
        CurrentContextKeyMutex.Release( );
        If (!SetTLS(CurrentContextKey, ucp)) throw Error( ); return; }
static const ucontext_t* GetCurrentContext( )
        {ucontext_t *ucp; CurrentContextKeyMutex .Take( );
        if (CurrentContextKey == INVALID_TLSKEY)
            {CurrentContextKey = CreateTLS( );
            If (CurrentContextKey == INVALID_TLSKEY)
                {CurrentContextKeyMutex.Release( ); throw Error_Memory( ); } }
        CurrentContextKeyMutex.Release( );
        ucp = (ucontext_t *)GetTLS(CurrentContextKey);
        if (!ucp)       //Main or new "main" thread. Context will be a memory leak.
            {           //Shouldn't be so many.
            ucp = (ucontext_t *)malloc(sizeof(ucontext_t));
            if (!ucp) throw Error_Memory( );
            memset(ucp, 0, sizeof(ucontext_t));
            ucp->uc_thread new uContext_Thread(ucp);    //Just need
            if (!ucp->uc_thread) throw Error_Memory( );  //ContextSemaphore.
            SetTLS (CurrentContextKey, ucp); } return ucp; }
//****Thread for "new" context (makecontext)****
uContext_Thread::uContext_Thread(ucontext_t *this_ucp)
        :
        ActiveSemaphore(0), ContextSemaphore(0)
            {argc = 0; argv = NULL; func = NULL; Done = false; ucp = this_ucp; return; }
uContext_Thread::~uContext_Thread( ) { if (argv) free(argv); return; }
void uContext_Thread::SetFunction(void (*func)( ), int argc, STACKWORD *argv)
{this->argc = argc; this->argv = argv;
        this->func = (void (*)(int, . . .))func; return; }
uContext_Thread::ThreadMain( )
        {SetCurrentContext(ucp); Done false; Suspend( ); SetCurrentContext(ucp);
        ucontext_t *uc_parent = (ucontext_t *)ucp->uc_link;
        //****Unmask signals, call thread function****
        SetSignalMask(&ucp->uc_sigmask);
        switch (argc)
            {case 0: ((void (*)( ))func)( ); break;
            case 1: func(argv[0]);break;
            case 2: func(argv[0], argv[1]);break;
            case 3: func(argv[0], argv[1], argv[2]);break;
            case 4: func(argv[0], argv[1], argv[2], argv[3]);break;
            case 5: func(argv[0], argv[1], argv[2], argv[3], argv[4]);break;
            case 6: func(argv[0], argv[1], argv[2], argv[3], argv[4], argv[5]);break;
            case 7: func(argv[0], argv[1], argv[2], argv[3], argv[4], argv[5], argv[6]);break;
            case 8: func(argv[0], argv[1], argv[2], argv[3], argv[4], argv[5], argv[6],
argv[7]) ;break;
            case 9: func(argv[0], argv[1], argv[2], argv[3], argv[4], argv[5], argv[6], argv[7],
argv[8]) ;break;
            case 10: func(argv[0], argv[1], argv[2], argv[3], argv[4], argv[S], argv[6], argv[7],
argv[8], argv[9]);break;
            default: throw Error( ); }
        BlockSignals( ); Done = true;
        //****Return from parent setcontext( ) - goto parent****
        SetCurrentContext(NULL);
        ((uContext_Thread *)uc_parent->uc_thread)->Release(uc_parent); return 0; }
//****ucontext functions****
void makecontext(ucontext_t *ucp, void (*func)( ), int argc, . . . )
        {va_list params;
        if (!ucp || !argc) return;
        ucp ->uc_thread = new uContext_Thread(ucp);
        if (!ucp->uc_thread) throw Error_Memory( );
        //****Acquire the parameters to pass to 'func'****
        STACKWORD *argv = NULL;
        if (argc-1)
            { argv = (STACKWORD *)malloc(sizeof(STACKWORD)*(argc–1));
            if (!argv) throw Error_Memory( );
```

-continued

```
        va_start(params, argc);
        for (int i=0; i<argc-1, i++) {argv[i] = va_arg(params, STACKWORD); }
        va_end(params); }
        ((uContext_Thread *)ucp->uc_thread)->SetFunction(func, argc-1, argv);
    //****Start Thread - just until it synchronizes****
        ((uContext_Thread *)ucp->uc_thread)->Start( ); return; }
int setcontext(const ucontext_t *ucp)
    {if (!ucp) return -1;
    uContext_Thread *this_thread, *target_thread
    const ucontext_t *this_context = GetCurrentContext( );
    this_thread (uContext_Thread *)this_context->uc_thread;
    target_thread = (uContext_Thread *)ucp->uc_thread;
    assert(this_context); assert(this_thread); assert(target_thread);
    if (target_thread == this_thread)
        { //****Same thread -> just jump to the saved stack position****
        BlockSignals( ); SetCurrentContext(ucp);
        Siglongjmp(((ucontext_t*)ucp)->jmpbuf,1); }
        sigset_t this_sigmask; GetSignalMask(&this_sigmask);
        BlockSignals( ); target_thread->Release(ucp);
    //****Stop****
        this_context = this_thread->Suspend( );
    //****Revived****
        assert(this_context); SetCurrentContext(this context);
        If (target_thread->IsDone( ))
        { //****Previous context ended, cleanup and return****
        delete target_thread; ((ucontext_t *)ucp->uc_thread = NULL;
        SetSignalMask(&this_sigmask); }
    else
        {//****Return to getcontext( )****
        Siglongjmp(((ucontext_t*)this_context)->jmpbuf, 1); } return 0; }
int swapcontext(ucontext_t *oucp, constucontext_t *ucp)
    {bool Returning = false; int rc = getcontext(oucp);
    if (rc != 0) return rc;
    if (!Returning)
        {Returning = true; setcontext(ucp); } return 0; }
int __getcontext(ucontext_t *ucp)
    {if (!ucp) return -1;
    Const ucontext_t *current*context = GetCurrentContext( );
    if (ucp != current_context) // Not current active thread so initialize the structure
        { memset(ucp,0,sizeof(ucontext_t));
        ucp->uc_link current_context; ucp->uc_thread = current_context->uc_thread;
        ucp->ucstack.ss_size = 1; //For compatibility. Get the current signal mask for
stating up new thread contexts created by makecontext( ).
        GetSignalMask(&ucp->uc_sigmask); } return 0; }
End of Code
```

The invention claimed is:

1. A method for running application programs supporting multiple contexts on a computer system, the method comprising:

processing a context processing instruction from said runtime application program;

evaluating said instruction in relation to program-flow control yielding context-defining processing parameters;

analyzing said context-defining processing parameters from the execution context of said context processing instruction in regard of program flow management by threads;

mapping said context-processing instruction to a selected thread managing instruction or to a selected set of thread managing instructions, having a respective program flow control effect equivalent to that of said context-processing instruction;

invoking said selected thread managing instruction or said set thereof, together with selected parameters for guaranteeing that during runtime of said application program;

only one thread is allowed to execute at a time using at least one semaphore, and the program state of a thread to be stored at a point in time and to be restored later from said point in time, wherein a setjmp-equivalent operation is used for storing the CPU state at any given point in time, and a longjmp-equivalent operation is used for restoring the CPU state at any later point in time; and swapping between contexts by executing a getcontext function followed by executing a setcontext function, wherein the setcontext function suspends a thread of an active context, releases a thread of a destination context by releasing an associated semaphore, and then loads a CPU with a register set stored in a CPU snapshot by calling a longjmp-equivalent operation with information recorded by an associated getcontext function, wherein if the destination thread has not ended, the CPU is loaded with the snapshot from the getcontext function, or if the destination thread has ended, any thread resources allocated during a makecontext function are freed.

2. The method according to claim 1, wherein said context processing is a u-context instruction.

3. The method according to claim 1, further comprising the step of:

stopping the execution of a thread by a semaphore instruction, when in the run-time application program execution a getcontext instruction is executed.

4. The method according to claim 1, wherein a thread is encapsulated by a class providing invocation, suspend, and resume methods.

* * * * *